| United States Patent Office | 3,577,465
Patented May 4, 1971 |
| --- | --- |

3,577,465
TERMINALLY UNSATURATED FLUOROOLEFINS
Louis Gene Anello, Basking Ridge, and Richard Francis Sweeney, Dover, N.J., and Morton Herbert Litt, University Heights, Cleveland, Ohio, assignors to Allied Chemical Corporation, New York, N.Y.
No Drawing. Continuation-in-part of application Ser. No. 633,359, Apr. 25, 1967. This application Apr. 12, 1968, Ser. No. 721,113
Int. Cl. C07c 43/00
U.S. Cl. 260—614    5 Claims

ABSTRACT OF THE DISCLOSURE

Terminally unsaturated polyfluoroolefinic compounds of the formula

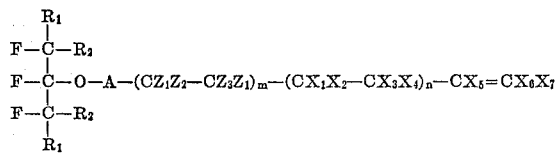

wherein $R_1$ and $R_2$ are Cl, F, alkyl, haloalkyl, or alkylene and haloalkylene groups forming a cycloaliphatic structure, wherein A represents alkylene or haloalkylene groups, wherein $-(CZ_1Z_2-CZ_3Z_4)-$ and $$-(CX_1X_2-CX_3X_4)-$$

wherein $Z_1-Z_4$ may be selected from H, F, Cl and perhalomethyl groups, wherein $Z_2$ and $Z_4$ may additionally be selected from haloalkyl groups and aralkyl groups and alkyl or haloalkyl which may be interrupted with ether linkages; and $X_1-X_7$ may be selected from H, F and Cl groups; are bifunctional groups derived from certain telomerizable unsaturated compounds, wherein $m$ and $n$ are integers of from 0 to 75, and wherein $-CX_5=CX_6X_7$ is derived from bifunctional group $-(CX_1X_2-CX_3X_4)-$ are prepared from polyfluorohalides of the formula

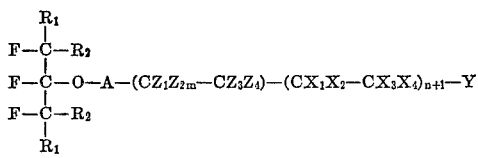

wherein Y is H or a halogen and $R_1$, $R_2$, A, $Z_1-Z_4$, $X_1-X_4$, $m$ and $n$ are as defined above by methods such as dehydrohalogenation or dehalogenation of the terminal $$-(CX_1X_2-CX_3X_4)-Y$$

group. These terminally unsaturated fluoro-olefinic compounds are useful as intermediates for the preparation of fluorocarbon acids of art recognized utility.

CROSS-REFERENCE TO RELATED APPLICATIONS (1) This application is a continuation-in-part of our copending application, Ser. No. 633,359, filed Apr. 25, 1967, entitled "Telomers and Process for the Preparation Thereof," now U.S. Patent 3,514,487.

Other related applications are:

(1) Copending application of Litt et al., entitled "Fluorinated Ethers," Ser. No. 492,276, filed Oct. 1, 1965, now U.S. Patent 3,453,333.

(2) Copending application of Litt et al., entitled "Fluorinated Ethers," Ser. No. 513,574, filed Dec. 13, 1965, now U.S. Pat. 3,470,256.

(3) Copending application of Anello et al., entitled "Fluorocarbon Acids and Derivatives," Ser. No. 721,115, filed of even date herewith.

BACKGROUND OF THE INVENTION

This invention relates to novel terminally unsaturated polyfluoro-olefinic compounds.

Highly fluorinated organic compounds differ from their carbon-hydrogen analogues in their increased stability and resistance to attack by reagents, hence may be modified only with great difficulties. Terminally unsaturated polyfluoro-olefinic compounds, on the other hand, due to the reactivity of the terminal olefinic unsaturation, are capable of entering into a number of useful reactions leading to other polyfluorinated compounds of art-recognized utility. For these reasons the provision of new terminally unsaturated polyfluoro-olefinic compounds is highly desirable.

Accordingly, it is an object of the present invention to provide novel terminally unsaturated polyfluoro-olefinic compounds.

Other objects of the present invention are apparent from the following description and claims.

SUMMARY OF THE INVENTION

The terminally unsaturated polyfluoro-olefinic compounds of the present invention have the structural formula

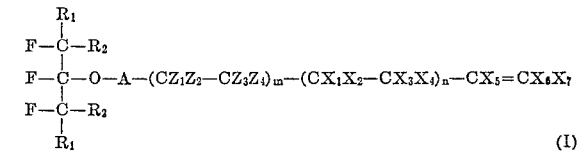

wherein:

(A) $R_1$ and $R_2$ are each F, Cl or alkyl or haloalkyl groups, or when taken together, are alkylene or haloalkylene groups forming a cycloaliphatic structure, which $R_1$ and $R_2$ groups may each have from 1 to 9 carbon atoms and in which the halogen atoms, if any, have an atomic weight not exceeding about 35.5, with the provisos that not more than two of the four $R_1$ and $R_2$ groups are alkyl groups, and that not more than three of the $R_1$ and $R_2$ groups are haloalkyl groups, (B) A is a member selected from the group consisting of radicals of the formulae:

$$-CHR_3- \quad -CHR_4-, \quad -CFR_5CR_6R_7- \quad \text{and} \quad -CH-\_-CH-\overset{CH_2-(CH_2)_p}{\underset{}{|\quad\quad|}}$$

wherein $R_3$ and $R_4$ are independently selected from the group consisting of Cl, H and alkyl; $R_5$ and $R_6$ are independently selected from the group consisting of F and H; $R_7$ is selected from the group consisting of F, H, Cl and perfluoroalkyl; $p$ is an integer of from 1 to 9; with the proviso that when both $R_6$ and $R_7$ are F, $R_5$ is always F, (C) $-(CZ_1Z_2-CZ_3Z_4)-$ is a bifunctional group derived from a telomerizable ethylenically unsaturated compound wherein (a) $Z_1$, $Z_2$, $Z_3$ and $Z_4$ may each be selected from the group consisting of H, F and Cl, provided that $Z_1-Z_4$ do not include more than two chlorine atoms, (b) when at least two members of the group $Z_1$, $Z_2$, $Z_3$ and $Z_4$ are H or F, the remaining two members may each be a perhalomethyl group having the formula $-C(X_a)_3$, wherein $X_a$ is a halogen atom having an atomic weight not exceeding about 35.5, (c) when $Z_1$ and $Z_3$ are each H or F, each of $Z_2$ and $Z_4$ may additionally be selected from the group consisting of $-CF_2X_b$, $-Y_1-OY_2$, $-Y_1-Y_3$, and $-O-Y_4$, wherein $X_b$ is an alkyl radical having from 1–8 carbon atoms, or a haloalkyl radical having from 1–8 carbon atoms, in which haloalkyl radical the halogen atoms have an atomic weight not exceeding about 35.5; wherein $Y_1$ is a saturated divalent alkylene bridging group or a saturated divalent halogen containing bridging group in which the halogen atoms have atomic weights not exceeding about 35.5; $Y_2$ is alkyl; $Y_3$ is aryl; and $Y_4$ is alkyl, (d) when $Z_1$, $Z_2$ and $Z_3$ are each H or F, $X_b$ may additionally be an aryl, haloaryl, alkaryl, or haloalkaryl group having from 1 to 5 carbon atoms in the alkyl group, and (e) $Z_3$ and $Z_4$ or $Z_1$ and $Z_3$ may be joined together to form a cycloaliphatic ring system, (D) $m$ is an integer of from 0 to about 75, (E) $-(CX_1X_2-CX_3X_4)-$ is a bifunctional group derived from a telomerizable ethylenically unsaturated compound wherein $X_1-X_4$ are selected from the group consisting of H, F and Cl, provided $X_1-X_4$ do not include more than one chlorine atom, (F) $n$ is an integer of from 0 to about 75, (G) $-CX_5=CX_6X_7$ is a monovalent ethylenically unsaturated group wherein $X_5$, $X_6$ and $X_7$ are independently selected from the group consisting of H, F and Cl, with the provisos that when $X_5$ is H, $X_6$ and $X_7$ may not both be Cl, and when $X_5$ is Cl, $X_6$ and $X_7$ are independently selected from the group consisting of H and F, and with the further provisos that when $n$ is an integer of from 1 to about 75, then (a) $X_5$ is the same as $X_1$ or $X_2$, provided that when $X_1$ and $X_2$ are both halogen, then $X_5$ is always F, (b) $X_6$ is the same as $X_3$ or $X_4$, (c) $X_7$ is selected from the group consisting of H, F, Cl, with the provisos that (i) when $X_3$ and $X_4$ are both H, then $X_7$ has an atomic weight up to and including that of the higher atomic weight of $X_1$ or $X_2$, except that when $X_5$ is a halogen and one of $X_1$ and $X_2$ is H, then $X_7$ is always H;

(ii) when $X_3$ and $X_6$ are H, then $X_4$ is halogen, then $X_7$ has an atomic weight up to and including that of $X_4$, except that $X_7$ may not be H when $X_4$ is F and $X_1$, $X_2$ and $X_5$ include one or three fluorine atoms, or two chlorine atoms;

(iii) when $X_3$ is H, $X_1$, $X_2$ and $X_4$ are all halogen, and $X_6$ is $X_4$, then $X_7$ is either F or Cl;

(iv) when $X_3$ and $X_5$ are both H, $X_4$ is a halogen, and $X_6$ is $X_4$, then $X_7$ is a halogen having an atomic weight up to and including that of $X_4$, except that $X_6$ may not be $X_4$ when $X_4$ is Cl and $X_1$ and $X_2$ are H and F, respectively;

(v) when $X_3$ and $X_4$ are both halogen, then $X_6$ is always the one of $X_3$ and $X_4$ which has the lower atomic weight, and $X_7$ has an atomic weight up to and including that of the higher atomic weight of $X_3$ or $X_4$, except that $X_7$ may not be H when both of $X_3$ or $X_4$ are F and $X_1$, $X_2$ and $X_5$ include one or more fluorine atoms, or two chlorine atoms, with the proviso that no halogen substituent in the molecule may have an atomic weight higher than the highest atomic weight of either $X_5$, $X_6$ or $X_7$.

The terminally unsaturated polyfluoroolefinic compounds of the present invention are prepared from fluorinated telomers having the formula

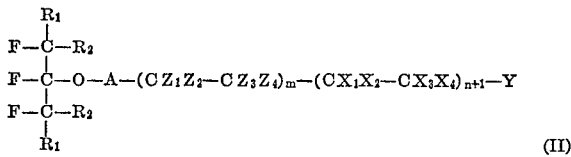

(II)

wherein $R_1$, $R_2$, A, $-(CZ_1Z_2-CZ_3Z_4)-$, $-(CX_1X_2-CX_3X_4)-$ $m$ and $n$ have the aforestated meanings, and wherein Y is selected from the group consisting of H, F, Cl, Br and I by methods effecting simultaneous elimination of one substituent each from each of the two carbon atoms of the terminal $-(CX_1X_2-CX_3X_4)-Y$ group.

Fluorinated telomer starting materials presented by Formula II above and their preparation are described in commonly assigned copending application of Anello et al., Ser. No. 633,359, filed Apr. 25, 1967, now U.S. Pat. 3,514,487, of which this application is a continuation-in-part. The pertinent subject matter of this application is hereby incorporated by reference. As described in more detail in the referred to Anello et al. patent, these fluorinated telomers are prepared by radical addition reactions of polyhaloisoalkoxyalkyl halide telogens of the formula

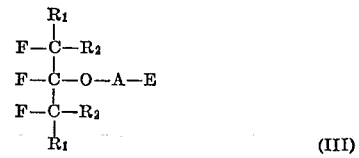

(III)

wherein $R_1$, and $R_2$ and A have the aforestated meanings, and wherein E is I, Br or Cl, with telomerizable unsaturated compounds. The telomerization reaction may be initiated by heat or by means of a free-radical initiating catalyst. The telogen starting materials may be prepared by reacting a corresponding halogenated ketone with an ionizable fluoride salt, e.g. CsF, to form a fluorinated organic salt and then reacting the organic salt with a halogen other than fluorine and an olefin, as more fully described in copending applications of Litt et al., Ser. No. 492,276, filed Oct. 1, 1965, now U.S. Pat. 3,453,333, and Ser. No. 513,574, filed Dec. 13, 1965, now U.S. Pat. 3,470,256, the pertinent subject matter of which is hereby incorporated by reference.

Fluorinated telomers wherein the E atom is chlorine, fluorine or hydrogen may be obtained by suitable replacement of the E atom of telomers wherein E is iodine or bromine. Such replacement may be carried out by any conventional method. For example, telomer iodides or bromides as above described, wherein $R_1$ and $R_2$ are F atoms or perfluoroalkyl groups and in which the A moiety is perfluorinated, may be reacted with elemental chlorine at a temperature from 20 to about 270° C., or reacted with a fluorinating agent such as $SbF_5$, $CoF_3$, elemental fluorine or KF in a polar solvent at normal or elevated temperatures up to about 300° C., to form the corresponding telomer chloride or fluoride. Corresponding hydrogen replacement can be effected by reacting the telomer iodide or bromide with a mild reducing agent such as $LiAlH_4$ or with zinc and alcohol. In any event, the chlorinating, fluorinating or reducing agents and conditions chosen should be such as to enable carrying out the reaction without adverse effects on the molecule involved.

Fluorinated telomers corresponding to Formula II above wherein the terminal group $-(CX_1X_2-CX_3X_4)-Y$ carries at least one hydrogen atom and one halogen atom in vicinal arrangement can be converted to corresponding terminally unsaturated fluoro-olefinic compounds of the present invention by dehydrohalogenation of the terminal $-(CX_1X_2-CX_3X_4)-Y$ group, as illustrated by the following exemplary equations:

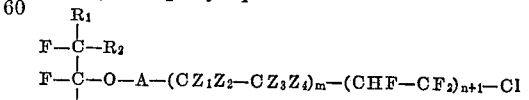

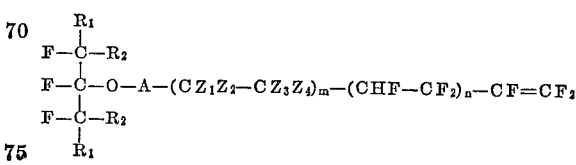

and

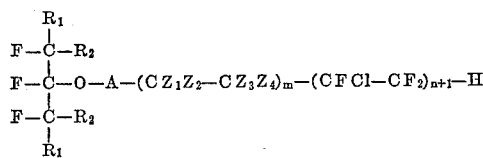

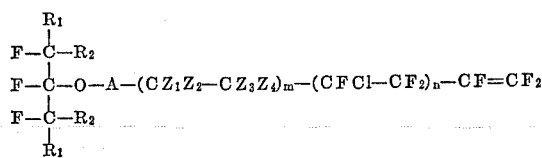

Dehydrohalogenation of suitable fluorinated telomer starting materials may be effected by base-catalyzed elimination by reacting the fluorinated telomer with a metal hydroxide or alkoxide, preferably an alkali metal hydroxide or alkoxide, or an amine, in a suitable solvent such as, for example, water-miscible alcohols, or other polar organic solvents such as dimethyl formamide, acetonitrile, dimethyl sulfoxide, dioxane, and the like.

Fluorinated telomers corresponding to Formula II above wherein in terminal group $-(CX_1X_2-CX_3X_4)-Y$, $X_1$ and $X_2$ include at least one halogen atom, and wherein $X_3$, $X_4$ and $Y$ include at least one hydrogen atom and at least one halogen atom, but not more than one fluorine atom, provided that $X_1$, $X_2$, $X_3$, $X_4$ and $Y$ include at least one halogen other than fluorine, can be converted to corresponding terminally unsaturated fluoro-olefinic compounds of the present invention by dehalogenation of the terminal $-(CX_1X_2-CX_3X_4)-Y$ group, as illustrated by the exxemplary equation set forth below:

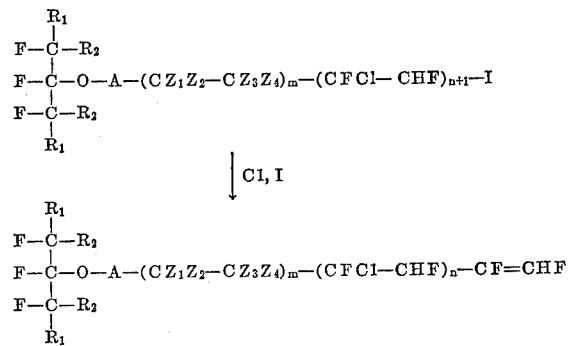

Dehalogenation of suitable fluorinated telomer starting materials may be effected by treatment with metallic zinc or other metals suitable to effect dehalogenation, such as, for example, tin, manganese, magnesium, and iron, preferably in the presence of a polar organic solvent, such as, for example, ethanol, propanol, or glycerol, at elevated temperature.

Preparative methods other than those mentioned herein will be readily apparent to those of ordinary skill in the art.

The terminally unsaturated polyfluoro-olefinic compounds of this invention may be oxidized at the terminal carbon-to-carbon double bond, for example by treatment with oxidizing agents such as potassium permanganate or dichromate, to obtain fluorinated carboxylic acids as illustrated below:

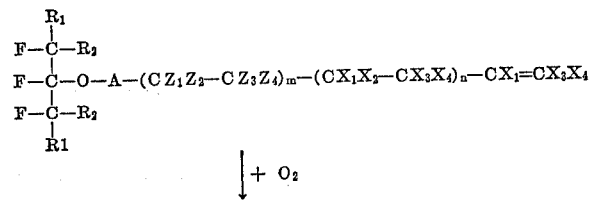

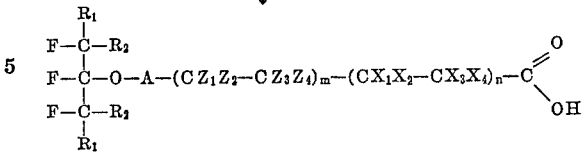

Fluorinated carboxylic acids of that type are described and claimed in commonly assigned copending application Ser. No. 721,115 by Anello et al., entitled "Fluorocarbon Acids and Derivatives," filed of even date herewith. The metal salts of these acids exhibit unusually high surface active properties and may be used in the manner in which surfactants are conventionally employed, such as in the preparation of emulsions and surface coatings and to increase wettability such as in the dyeing of textile fabrics.

Many other uses for the terminally unsaturated polyfluoro-olefinic compounds of the present invention will readily occur to those skilled in the art.

DESCRIPTION OF THE PREFERRED EMBODIMENTS

With reference to Formula I, $R_1$ and $R_2$ are preferably F or perfluoroalkyl groups. If perfluoroalkyl groups, $R_1$ and $R_2$ preferably contain 1–2 carbon atoms. When the $R_1$ and $R_2$ groups contain halogen substitution, other than fluorine or hydrogen substitution, it is preferred that enough fluorine substitution be provided so that the atomic ratio of fluorine to the other halogen atoms, to the hydrogen atoms or to the combined total of the other halogen atoms and hydrogen atoms, is at least 1:1.

The A moiety of the polyfluoro-olefinic compounds presented by Formula I, above, is preferably fluorinated. The preferred carbon content of the alkyl or perfluoroalkyl groups which may be contained in the A moiety is from 1–6 carbon atoms.

Specific examples of preferred embodiments of the

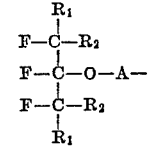

moiety of the polyfluoro-olefinic compounds represented by Formula I include the following:

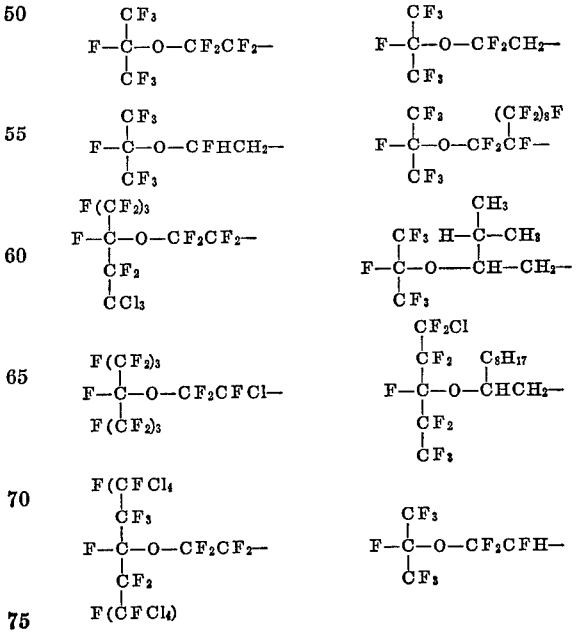

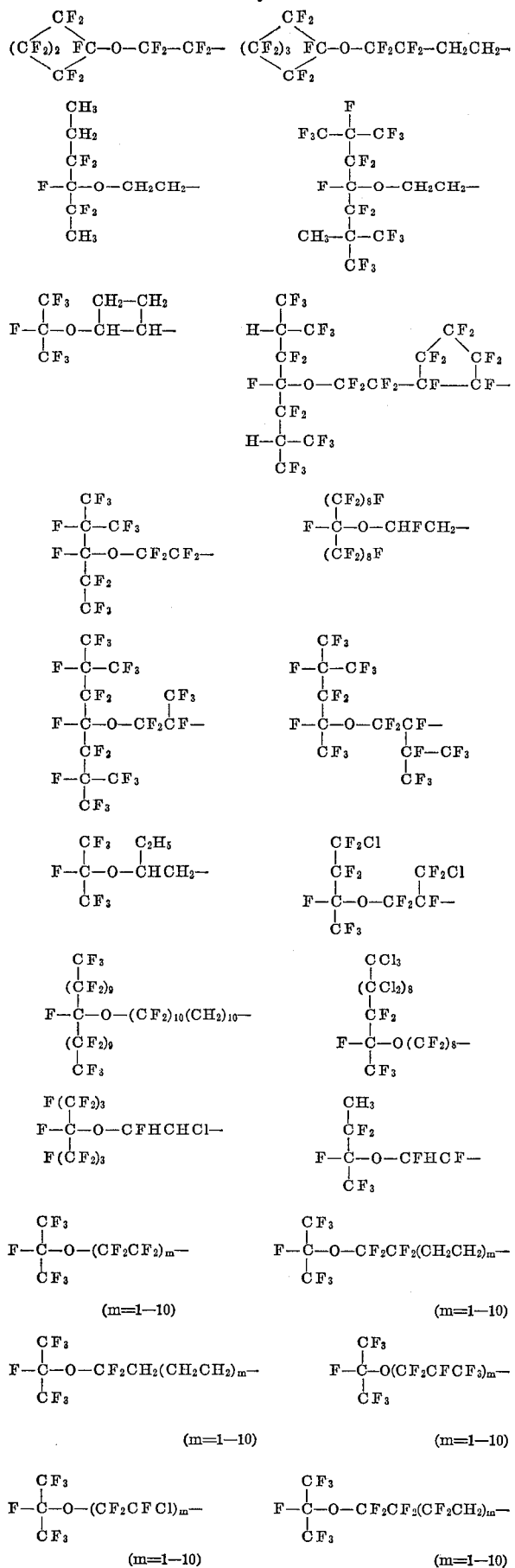

Preferred specific embodiments of the invention are terminally unsaturated fluoro-olefins corresponding to the general Formula I above, having the formula $$F-\underset{\underset{CF_3}{|}}{\overset{\overset{CF_3}{|}}{C}}-O-CF_2CF_2-(CZ_1Z_2-CZ_3Z_4)_m-(CX_1X_2-CX_3X_4)_n-CX_5{=}CX_6X_7 \quad (IV)$$

wherein —$(CZ_1Z_2$—$CZ_3Z_4)$— is derived from an ethylenically unsaturated compound selected from the group consisting of tetrafluoroethylene, ethylene, vinylidene fluoride, chlorotrifluoroethylene, and perfluoropropylene; wherein —$(CX_1X_2$—$CX_3X_4)$— is derived from an ethylenically unsaturated compound selected from the group consisting of tetrafluoroethylene, ethylene, vinylidene fluoride and chlorotrifluoroethylene; wherein $m$ is an integer of from 0 to about 75; and wherein $n$ is an integer of from 0 to about 75. More preferably, $m$ and $n$ are integers of from 0 to about 40, and still preferably from 0 to about 7.

More specific preferred embodiments are those in which in above Formula IV —$(CZ_1Z_2$—$CZ_3Z_4)$— is derived from tetrafluoroethylene and —$(CX_1X_2$—$CX_3X_4)$— is derived from ethylene.

A particularly preferred embodiment is shown by the formula:

$$(CF_3)_2CFOCF_2CF_2(CF_2CF_2)_mCH{=}CH_2$$

wherein $m$ is an integer 0.3.

Unsaturated compounds suitable for reaction with the polyhaloisoalkoxyalkyl halide telogen of Formula III above to furnish the bifunctional group $$-(CZ_1Z_2-CZ_3Z_4)-$$

include the following:

$CF_2{=}CF_2$, $CF_2{=}CH_2$, $CCl_2{=}CH_2$, $CFH{=}CH_2$
$CClH{=}CH_2$, $CH_2{=}CH_2$, $CFH{=}CF_2$, $CFH{=}CFH$
$CClH{=}CClH$, $CF_2{=}CFCl$, $CF_3CF{=}CF_2$
$CF_2ClCF{=}CF_2$, $CF_3CH{=}CF_2$, $CF_3CCl{=}CF_2$
$(CF_3)_2C{=}CF_2$, $CF_3CF{=}CFCl$, $CF_3CH{=}CFCl$
$CFCl{=}CFCl$, $CF_3CF{=}CH_2$, $CF_3CF{=}CFCF_3$
$CHF{=}CFCFCl_2$, $CHF{=}CFCF_3$, $CF_2{=}CF(CH_2)_6CH_3$
$CF_2{=}CFCHClCH_3$, $CF_2{=}CF(C_6H_4Cl)$
$CF_2{=}CF(C_6H_4(CH_3))$, $CF_2{=}CF(C_6H_4(CH_2Cl))$
$CF_2{=}CHCF_2CH_3$, $CF_2{=}CHCF_2CH_2Cl$
$CF_2{=}CHCF_2(C_6H_5)$, $CF_2{=}CHCF_2(C_6H_4Cl)$
$CF_2{=}CHC_2F_2(C_6H_4(CH_3))$
$CF_2{=}CHC_2F_2(C_6H_4(CH_2Cl))$
$CF_2{=}C(C_3F_3)CF_2(C_3H_7)$, $CHCl{=}CFCF_3$
$CH_2{=}CClCF_2CH_3$ $\underset{CF_2-CFH}{\overset{CF{=}CF}{|}}$, $\underset{CF_2-CF}{\overset{CFCl-CF}{||}}$, $\underset{CF_2-CF}{\overset{CF_2-CCl}{||}}$, $\underset{CFCl-CF}{\overset{CFCl-CF}{||}}$, $\underset{CF_2-CF_2}{\overset{CF{=}CF}{||}}$ $\underset{CHF-CF}{\overset{CHF-CF}{||}}$ (cyclic structures with $CF_2$ groups)

$CH_2{=}CHC_6H_5$, $CH_2{=}CHCH_2CH(OC_2H_5)_2$, and $$(CH_2{=}CHCH_2)_2O$$

A portion of this listing has been taken from the exemplary telomerizable unsaturated compounds listed in U.S.P. 3,145,222. Many more suitable telomerizable unsaturated compounds will readily occur to one of ordinary skill in the art.

Ethylenically unsaturated compounds suitable to furnish the bifunctional group —$(CX_1X_2$—$CX_3X_4)$— include the following: $CH_2{=}CH_2$, $CH_2{=}CHF$, $CH_2{=}CHCl$, $CH_2{=}CFCl$, $CHF{=}CHF$, $CHF{=}CHCl$, $CHF{=}CFCl$ $CH_2{=}CF_2$, $CHF{=}CF_2$, $CF_2{=}CF_2$, $CF_2{=}CFCl$, and $CF_2{=}CHCl$.

With reference to preparation of terminally unsaturated fluoro-olefinic compounds of the present invention by base-catalyzed dehydrohalogenation of an appropriate fluorinated telomer starting material, exemplary suitable base catalysts are the alkali-metal hydroxides and the organic bases such as the tertiary amines as e.g., tri-n-butylamine, dimethyl aniline, pyridine, piperidine, and triethylamine. Preferred bases are sodium hydroxide and potassium hydroxide.

The molar ratio of base to fluorinated telomer preferably ranges between about 1:1 to about 3:1. More preferred yet are ratios between about 1:1 to about 2:1. Ratios higher than about 3:1 may be used with no particular advantage.

The base-catalyzed dehydrohalogenation reaction is preferably carried out in a suitable solvent. Any water soluble alcohol may be used as a solvent when the base is an alkali metal hydroxide. Lower alkyl alcohols are preferred solvents. Specific examples of preferred solvents are methyl, ethyl, isopropyl, butyl, and hexyl alcohol. Most preferred are methyl, ethyl, and isopropyl alcohol. When the base employed is an organic base, the reaction is preferably carried out in the presence of a polar organic solvent, such as dimethyl formamide, acetonitrile, dimethyl sulfoxide, dioxane, and the like.

The amount of solvent employed is not critical. The solvent is preferably employed in an amount sufficient to provide an easily stirred reaction mixture.

The reaction temperatures are not critical. The reaction may suitably be conducted at any temperature between about room temperature (about 25° C.) and the reflux temperature of the reaction mixture. Preferred reaction temperatures range between about 40 to about 150° C., most preferred temperatures ranging between about 60° C. to about 80° C.

Reaction times are a function of the reaction temperature. Higher reaction temperatures result in shorter reaction times, and, conversely, lower reaction temperatures require longer reaction times. In most cases reaction times required for good conversions of suitable fluorinated telomers to terminally unsaturated fluoro-olefins of the present invention by base-catalyzed dehydrohalogenation will range between about 1½ to about 5 hours.

The reaction may be carried out batchwise or on a continuous basis.

Upon completion of the reaction the desired product may be recovered from the reaction mixture by conventional means, as for example by fractional distillation, crystallization, and others. Preferably the reaction mixture is first water-washed to remove solvent, by-product halide and unreacted base, and the water-insoluble product so recovered may be purified by conventional means, as e.g., fractional distillation.

Examples 1 through 3 show the preparation of illustrative compounds of the present invention by dehydrohalogenation of appropriate fluorinated telomers. These examples are illustrative only and are not intended to be limiting on the scope of the invention. In these examples the yield is defined as the percentage of the desired product actually obtained of the amount theoretically possible, based on the amount of fluorinated telomer charged to the process.

Example 1.—Preparation of

Into a 500 ml. 3-necked flask equipped with thermometer, stirrer, and dropping funnel were placed 150 g. of anhydrous ethanol and 52 g. (0.90 mol of KOH pellets. To this mixture were slowly added 200 g. (0.50 mol) of $(CF_3)_2CFO—CF_2CF_2—CH_2CH_2I$ over a period of 2 hours. The reaction mixture heated spontaneously, indicating an exothermic reaction. The mixture was then refluxed at about 64° C. for a period of about 14 hours. A white precipitate of KI was formed. The reaction mixture was then cooled to room temperature, washed twice with water, aqueous and organic layers were separated, and the organic layer was dried over sodium sulfate. Insoluble contaminants were removed by filtration, and the organic layer was fractionally distilled at atmospheric pressure. There was thus recovered as distillate a main fraction of 113.5 g. (0.36 mol) of $$(CF_3)_2CFO—CF_2CF_2—CH=CH_2$$

product boiling at 78° C.–79° C. in 72 percent yield, and a fraction of 41 g. (0.093 mol) of the starting material $(CF_3)_2CFO—CF_2CF_2—CH_2CH_2I$ boiling at 145° C.–147° C.

Elemental analysis of the product compared with the calculated composition of $C_7F_{11}H_3O$ as follows:
Calculated (percent): C, 26.92; F, 66.99; H, 0.97.
Found (percent): C, 26.54; F, 66.2; H, 0.88.
The assigned structure was confirmed by infrared analysis which showed a C=C absorption band at 6.1μ.

Example 2.—Preparation of
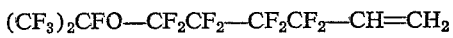

Into a 250 ml. 3-necked flask were placed 50 g. of anhydrous methanol and 23 g. (0.41 mol) of KOH pellets. To this mixture were slowly added 51 g. (0.094 mol) of $(CF_3)_2CFO—CF_2CF_2—CF_2CF_2—CH_2CH_2I$. This mixture was refluxed at 64° C. for a period of 3 hours. A white precipitate of KI formed. The reaction mixture was then cooled to room temperature, was washed twice with water, aqueous and organic layers were separated, and the organic layer was dried over sodium sulfate. The sodium sulfate was then removed by filtration, and the organic layer was subjected to fractional distillation. There was thus recovered 20 g. (0.049 mol) of $$(CF_3)_2CFO—CF_2CF_2—CF_2CF_2—CH=CH_2$$

B.P. 120–121° C.
Elemental analysis of the product compared with calculated composition of $C_9F_{15}H_3O$ as follows:
Calculated (percent): C, 26.21; F, 69.17; H, 0.73.
Found (percent): C, 26.10; F, 68.8; H, 0.69.
Infrared analysis showed a C=C absorption band at about 6.05μ.

Example 3.—Preparation of
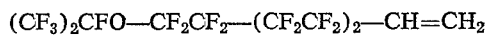

Into a 250 ml. 3-necked flask were placed 50 g. of absolute methanol and 8.75 g. (0.156 mol) of KOH pellets. To this mixture were slowly added 50 g. (0.078 mol) of $(CF_3)_2CFO—CF_2CF_2—(CF_2CF_2)_2—CH_2CH_2I$. The temperature of the reaction mixture rose spontaneously to 45° C. The mixture was then heated to 80° C. and was kept at this temperature for a period of 4 hours. The reaction mixture was then cooled to room temperature, washed twice with water, aqueous and organic layers were separated, and the organic layer was dried over sodium sulfate. The sodium sulfate was then removed by filtration and the organic layer was fractionally distilled under reduced pressure. There was thus recovered as distillate a main fraction of 36.5 g. (0.071 mol) of $$(CF_3)_2CFO—CF_2CF_2—(CF_2CF_2)_2—CH=CH_2$$

boiling at 91° C.–93° C. at 75 mm. Hg in 91 percent yield.

Elemental analysis of the product compared with the calculated composition of $C_{11}F_{19}H_3O$ as follows:
Calculated (percent): C, 25.94; F, 71.41; H, 0.49.
Found (percent): C, 26.32; F, 71.84; H, 0.55.
The assigned structure was confirmed by infrared analysis which showed a C=C absorption band at 6.1μ.

Example 4.—Preparation of

In the manner of Example 2 there were reacted 50 g. (0.0675 mol) of $$(CF_3)_2CFO—CF_2CF_2.(CF_2CF_2)_3.CH_2CH_2I$$

with 8.75 g. (0.156 mol) KOH in 50 g. of absolute methanol. The reaction mixture was heated to 80° C. for a period of 3 hours. There were recovered 37.9 g. (0.062 mol) of $(CF_3)_2CFO—CF_2CF_2—(CF_2CF_2)_3—CH=CH_2$ product boiling at 77° C. to 79° C. at 10 mm. Hg in 92 percent yield.

Elemental analysis of the product compared with the calculated composition of $C_{13}H_{23}H_3O$ as follows:

Calculated (percent): C, 25.94; F, 71.41; H, 0.49.
Found (percent): C, 26.32; F, 71.84; H, 0.55.

The assigned structure was confirmed by infrared analysis which showed a C=C absorption band of 6.06μ.

With reference to preparation of terminally unsaturated fluoro-olefinic compounds of the present invention by dehalogenation of the terminal $—(CX_1X_2—CX_3X_4)—Y$ group of an appropriate fluorinated telomer starting material by treatment with a suitable metal in a polar organic solvent at elevated temperature, examples of metals suitable to effect dehalogenation are zinc, tin, manganese, and iron. Zinc is the preferred metal. The metal is preferably employed in finely divided form.

While the amount of metal being employed in the dehalogenation reaction is not critical, it is preferred, for the purpose of maximizing yield of the desired product, to employ the metal in excess of theoretically required amount, say in about 10 percent excess over theoretically required amount.

Dehalogenation must be carried out in the presence of a polar organic solvent. Methanol, ethanol, propanol, glycerol, dioxane, acetic acid, ethyl acetate, dimethyl formamide and acetone are illustrative examples of suitable polar solvents. Methanol is a preferred solvent. The amount of solvent is not critical. The solvent is preferably employed in amount sufficient to provide an easily stirred reaction mixture.

Suitable dehalogenation temperatures range between about 40° C. and about 150° C., temperatures between about 50° C. and about 150° C. being particularly suitable. The reflux temperature of the reaction mixture is a convenient dehalogenation temperature. If dehalogenation is to be conducted at temperatures above the atmospheric reflux temperature of the reaction mixture, dehalogenation may be carried out under superatmospheric pressures.

Reaction times are a function of reaction temperature. Higher reaction temperatures require shorter reaction times, and conversely, lower reaction temperatures require longer reaction times. In most cases good conversions can be obtained at reaction times varying between about 5 minutes to about 5 hours, although in some instances longer reaction times may be required.

Upon completion of the reaction the desired product may be recovered from the reaction mixture by conventional means, as for example by fractional distillation, crystallization, and others. Preferably the reaction mixture is filtered to remove unreacted metal and undissolved metal halide, followed by water wash to remove dissolved metal halide and water-miscible organic solvent. The water-immiscible product so recovered may be purified by conventional means, as, e.g., fractional distillation, suitably under reduced pressure.

The following example illustrates preparation of the compound $$(CF_3)_2CFO—CF_2CF_2—CF_2CF_2—CH=CH_2$$

by dehalogenation of $$(CF_3)_2CFO—CF_2CF_2—CF_2CF_2—CHCl—CH_2I$$

Example 5.—Preparation of
$(CF_3)_2CFO—CF_2CF_2—CF_2CF_2—CH=CH_2$

Into a 500 ml. flask are placed 200 g. of anhydrous ethanol and 65 g. of powdered zinc. The slurry is heated to about 50° C. while 150 g. of $$(CF_3)_2CFO—CF_2CF_2—CF_2CF_2—CHCl—CH_2I$$

is slowly added. This mixture is then maintained at a temperature of 65° C. for a period of 5 hours. The mixture is then allowed to cool to about room temperature, is filtered to remove unreacted zinc and undissolved zinc salts, is washed twice with water, dried over anhydrous magnesium sulfate, and is then subjected to fractional distillation. About 70 percent of the starting material is converted to and recovered as $$(CF_3)_2CFO—CF_2CF_2—CF_2CF_2—CH=CH_2$$

The table below lists illustrative $—(CX_1X_2—CX_3X_4)—$ moieties of compounds having the Formula II above suitable for conversion to terminally unsaturated groups $—CX_5=CX_6X_7$ by dehalogenation and dehydrohalogenation, and the corresponding terminally unsaturated groups obtained thereby.

TABLE

| $—(CX_1X_2—CX_3X_4)—$ | $—CX_5=CX_6X_7$ (by dehydrohalogenation) | $—CX_5=CX_6X_7$ (by dehalogenation) |
|---|---|---|
| $—(CH_2—CHF)—$ | $—CH=CH_2, —CH=CHF$ | |
| $—(CH_2—CHCl)—$ | $—CH=CH_2, —CH=CHF, —CH=CHCl$ | |
| $—(CH_2—CF_2)—$ | $—CH=CHF, —CH=CF_2$ | |
| $—(CH_2—CFCl)—$ | $—CH=CFH, —CH=CF_2, —CH=CFCl$ | |
| $—(CHF—CH_2)—$ | $—CH=CH_2, —CH=CHF, —CF=CH_2$ | $—CH=CH_2$ |
| $—(CHF—CHF)—$ | $—CF=CH_2, —CH=CHF, —CF=CHF, —CH=CF_2$ | $—CH=CHF$ |
| $—(CHF—CHCl)—$ | $—CF=CH_2, —CF=CHF, —CF=CHCl$ | $—CH=CH_2, —CH=CHF, —CH=CHCl$ |
| $—(CHF—CF_2)—$ | $—CF=CHF, —CH=CF_2, —CF=CF_2$ | $—CH=CF_2$ |
| $—(CHF—CFCl)—$ | $—CF=CHF, —CF=CF_2, —CF=CFCl$ | $—CH=CHF, —CH=CF_2, —CH=CFCl$ |
| $—(CHCl—CH_2)—$ | $—CH=CH_2, —CH=CHF, —CH=CHCl, —CCl=CH_2$ | $—CH=CH_2$ |
| $—(CHCl—CHF)—$ | $—CH=CHF, —CH=CF_2, —CCl=CHF, —CH=CFCl$ | $—CH=CH_2, —CH=CHF$ |
| $—(CHCl—CF_2)—$ | $—CH=CF_2, —CCl=CF_2$ | $—CF=CH_2, —CH=CHF, —CH=CF_2$ |
| $—(CF_2—CH_2)—$ | $—CF=CH_2, —CF=CHF, —CF=CHCl$ | $—CF=CH_2$ |
| $—(CF_2—CHF)—$ | $—CF=CHF, —CF=CF_2, —CF=CFCl$ | $—CF=CHF$ |
| $—(CF_2—CHCl)—$ | $—CF=CHCl, —CF=CFCl, —CF=CCl_2$ | $—CF=CH_2, —CF=CHF, —CF=CHCl$ |
| $—(CF_2—CF_2)—$ | $—CF=CF_2$ | $—CH=CHF, —CF=CF_2$ |
| $—(CF_2—CFCl)—$ | $—CF=CFCl$ | $—CF=CH_2, —CF=CF_2, —CF=CFCl$ |
| $—(CFCl—CH_2)—$ | $—CF=CH_2, —CF=CHF, —CF=CHCl$ | $—CF=CH_2$ |
| $—(CFCl—CHF)—$ | $—CF=CHF, —CF=CF_2, —CF=CFCl$ | $—CF=CH_2, —CF=CHF$ |
| $—(CFCl—CF_2)—$ | $—CF=CF_2$ | $—CF=CHF, —CF=CF_2$ |

The following examples illustrate preparation of fluorinated carboxylic acids from terminally unsaturated fluoroolefins of the present invention.

Example 6.—Preparation of
$(CF_3)_2CFO—CF_2CF_2—COOH$

Into a 500 ml. flask ekuipped with thermometer, stirrer and dropping funnel were placed 50.5 g. (0.32 mol) potassium permanganate, 10.5 g. (0.16 mol) 85 percent potassium hydroxide pellets and 200 ml. water. The mixture was heated with stirring to 100° C. and 150 g. (0.16 mol) of $(CF_3)_2CFO—CF_2CF_2—CH=CH_2$ was slowly added. The temperature dropped to 64° C. and was maintained at that level for a period of 2½ hours. The reaction mixture was then neutralized by addition of aqueous sulfuric acid, and the neutralized mixture was filtered to remove precipitated $MnO_2$. Aqueous and organic layers were separated, the organic layer was dried over sodium sulfate, and was then fractionally distilled under reduced pressure. There was thus obtained as distillate a main fraction of 20.7 g. (0.063 mol) of tetrafluoro-3-heptafluoroisopropoxy propanoic acid, $$(CF_3)_2CFO—CF_2CF_2—COOH$$

B.P. 79.5° C. to 80.5° C./40 mm. Hg.

Elemental analysis of the product compared with calculated composition of $C_6F_{11}O_3H$ as follows:

Calculated (percent): C, 21.02; F, 63.33; H, 0.30. Found (percent): C, 22.02; F, 63.75; H, 0.45.

Infrared analysis showed the presence of carboxyl absorption at 3.2 to 3.3μ, and carbonyl absorption at 5.65μ, consistent with assigned structure. Neutralization equivalent of the product was 338.4 (theory 330.8).

The effect of the sodium salt of this acid on the surface tension of water, determined with a tensiometer in accordance with ASTM Test D-1590 is as follows:

| Concentration of fluorinated salt in water (wt. percent): | Surface tension (dynes/cm.) |
|---|---|
| 0 | 73.0 |
| 0.14 | 57.2 |
| 0.27 | 44.0 |
| 0.53 | 37.0 |
| 1.25 | 34.6 |
| 2.30 | 29.6 |
| 3.70 | 23.0 |
| 5.50 | 22.6 |

Example 7.—Preparation of
$(CF_3)_2CFO-CF_2CF_2-(CF_2CF_2)_3-COOH$

Into a 500 ml. flask equipped with thermometer, stirrer and dropping funnel were placed 16.1 g. (0.102 mol) of $KMnO_4$ and 200 ml. water. 20.8 g. (0.034 mol) of $(CF_3)_2CFO-CF_2CF_2-(CF_2CF_2)_3-CH=CH_2$ was added rapidly. The mixture was heated to and maintained at a temperature of 100° C. for a period of 2½ hours, after which time the mixture was allowed to cool, was acidified with aqueous $H_2SO_4$, and was filtered to remove $MnO_2$. The organic layer was taken up in ether, was decolorized with $Na_2SO_3$, and was dried over sodium sulfate. The dried etheral solution was filtered and the ether was evaporated. There was thus recovered 5 g. (0.008 mol) of $(CF_3)_2CFO-CF_2CF_2-(CF_2-CF_2)_3-COOH$ Elemental analysis of the product so obtained compared with calculated composition of $C_{12}F_{23}O_3H$ as follows:

Calculated (percent): C, 22.86; F, 69.36. Found (percent): C, 23.02; F, 69.85.

Infrared analysis showed the presence of a carboxyl absorption at 3.2 to 3.3μ, and carbonyl absorption at 5.6μ, consistent with assigned structure.

Preparative methods other than those herein described may be employed to make the novel compounds of this invention. Preparation of terminally unsaturated fluoro-olefins of this invention from telogen starting materials having the formula

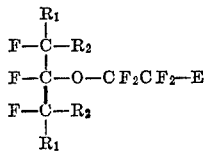

wherein $R_1$, $R_2$ and E have the aforestated meanings by telomerization reaction with appropriate telomerizable diolefins having two ethylenically unsaturated groups in terminal position to form a corresponding iodine- or bromine-containing terminally unsaturated fluoro-olefin, followed by replacement of the bromine or iodine with chlorine, fluorine or hydrogen to obtain compounds claimed herein is described in our copending application Ser. No. 633,359, filed Apr. 25, 1967, of which this application is a continuation-in-part.

While the fluorinated telomers useful as starting material for the preparation of terminally unsaturated polyfluoro-olefinic compounds of the present invention may be prepared as discrete compounds, they are generally obtained as mixtures of compounds of varying chain length and corresponding varying molecular weights. It is to be understood that both the individual discrete fluorinated telomers, as well as their mixtures of compounds of varying chain length, are suitable for preparation of the novel compounds of this invention. When employing the starting material mixtures of fluorinated telomers of varying chain length, there will, of course, be obtained terminally unsaturated polyfluoro-olefinic compounds of varying chain length. If desired, individual products can be separated from such product mixtures by conventional separation techniques, as for examples by fractional distillation, or by fractional crystallization using an inert solvent such as methylene chloride, ether, acetonitrile, carbon tetrachloride, and the like, or the product mixture may be separated into fractions of narrow ranges of molecular weights having desired properties. It is intended that the appended claims cover the individual compounds as well as mixtures thereof having varying chain length.

Since various changes and modifications may be made in the invention without departing from the spirit and essential characteristics thereof, it is intended that all matter contained in the above description shall be interpreted as illustrative only, the invention being limited only by the scope of the appended claims.

We claim:
1. Compounds having the general formula

$(CF_3)_2CFO-CF_2CF_2(CF_2CF_2)_mCH=CH_2$ wherein m is an integer 0–3.

2. A compound according to claim 1 which is $(CF_3)_2CFO-CF_2CF_2-CH=CH_2$

3. A compound according to claim 1 which is $(CF_3)_2CFO-CF_2CF_2-CF_2CF_2-CH=CH_2$ 4. A compound according to claim 1 which is $(CF_3)_2CFO-CF_2CF_2-(CF_2CF_2)_2CH=CH_2$ 5. A compound according to claim 1 which is $(CF_3)_2CFO-CF_2CF_2-(CF_2CF_2)_3-CH=CH_2$ References Cited

UNITED STATES PATENTS

| 3,274,239 | 9/1966 | Selman | 260—614FX |
| 3,331,813 | 7/1967 | Pittman et al. | 260—614UX |

FOREIGN PATENTS

| 6,602,167 | 8/1966 | Netherlands | 260—614F |

HOWARD T. MARS, Primary Examiner

U.S. Cl. X.R.

252—352; 260—535, 611